Sept. 25, 1962  A. T. BOHN ETAL  3,055,595
OSCILLATORY LAWN SPRINKLER
Filed Nov. 9, 1960  2 Sheets-Sheet 1
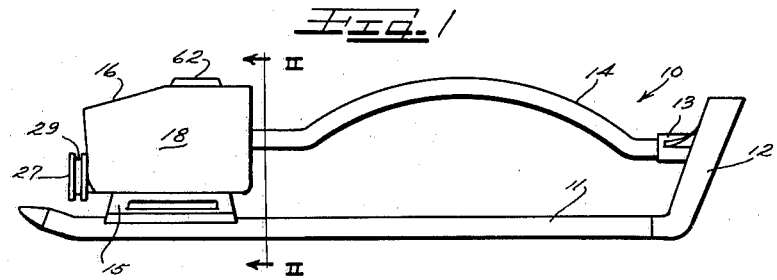
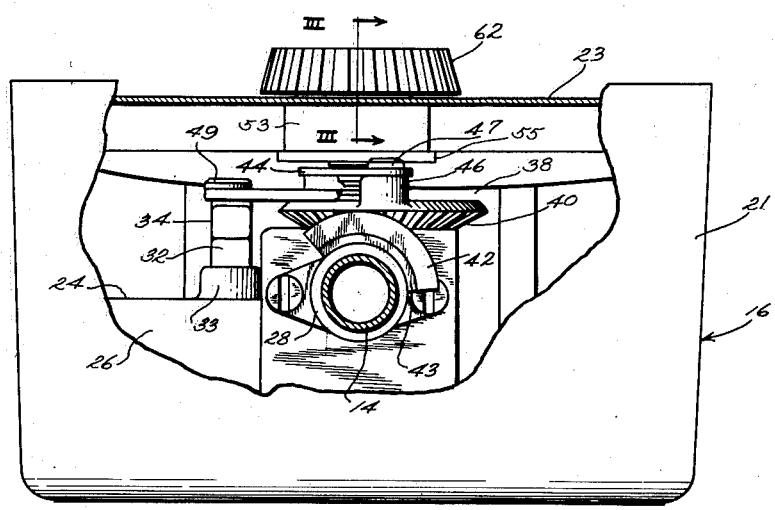
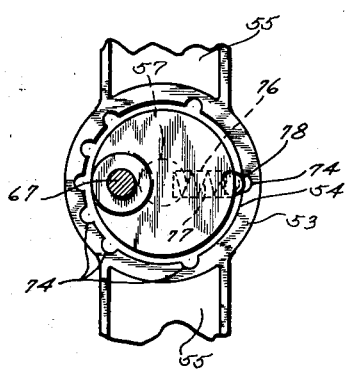
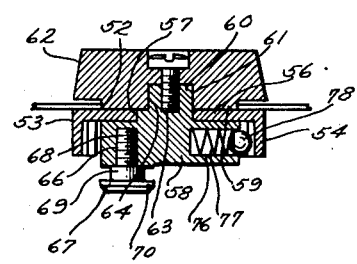
INVENTORS
ALFRED THOMAS BOHN
KIRK ROBERT BERGE
BY
ATTORNEYS Sept. 25, 1962
A. T. BOHN ETAL
3,055,595
OSCILLATORY LAWN SPRINKLER
Filed Nov. 9, 1960
2 Sheets-Sheet 2
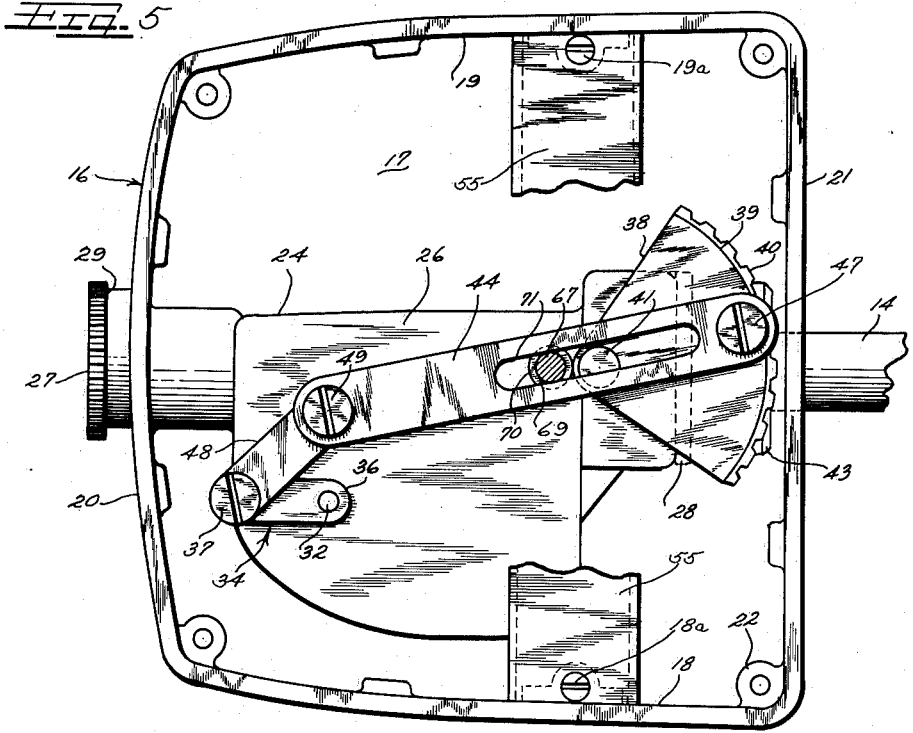
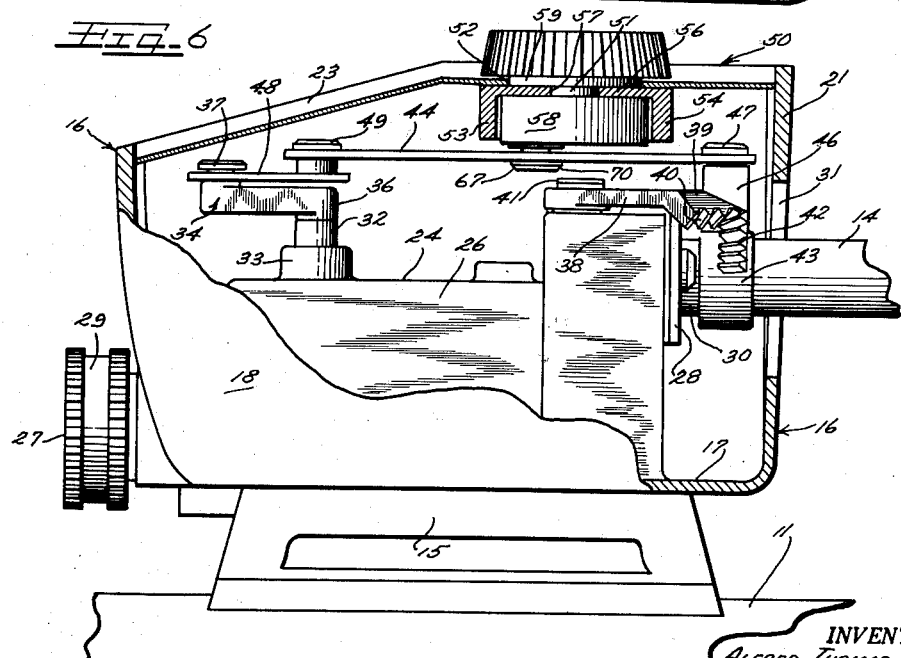
INVENTORS
ALFRED THOMAS BOHN
KIRK ROBERT BERGE
BY
ATTORNEYS 3,055,595
OSCILLATORY LAWN SPRINKLER
Alfred T. Bohn, Sycamore, Ill., and Kirk A. Berge, Burbank, Calif., assignors to Turner Corporation, Sycamore, Ill., a corporation of Illinois
Filed Nov. 9, 1960, Ser. No. 68,175
13 Claims. (Cl. 239—242)

This invention relates generally to oscillating lawn sprinklers and more particularly to an improved driving linkage for an oscillating sprinkler wherein the oscillatory traverse of the sprinkler tube may be selectively varied by an adjustment knob having a fixed axis of rotation and carried on the sprinkler housing, thereby facilitating continuous adjustment of the sprinkler, even when in operation.

Oscillating lawn sprinklers as heretofore provided have usually required the use of an adjustment means for varying the oscillatory traverse of the sprinkler tube as a part of the moving driving linkage. Accordingly, before any adjustment can be effected, the operation of the sprinkler must be stopped, the adjustment effected, and the operation of the device again restarted to check whether or not the adjustment has been efficacious.

In accordance with the method of adjustment contemplated by the present invention, a crank is rotatably driven at a substantially constant speed by a water motor, whereupon the crank movements are converted and transmitted through a connecting rod to an oscillatory lever which is pivoted to the motor casing. The oscillatory lever has a driving connection with the sprinkler tube. It is specifically contemplated that the lever will be selectively fulcrumed at adjusted positions, thereby to change the lever fulcrum for varying the oscillatory traverse of the sprinkler tube. Such selective fulcruming is effected through the utilization of an adjustment knob having a fixed axis of rotation in the sprinkler housing and actuating means forming an adjustable fulcrum for the connecting rod pivotally interconnecting the crank and the lever. The adjustable fulcrum may advantageously take the form of a fulcrum pin, while the connecting rod may be slotted to receive the pin. Thus, upon rotation of the knob, the fulcrum pin will be adjusted through a loci adjacent the connecting rod and the rotation of the knob will variably adjust the fulcrum in order to correspondingly adjust the oscillatory traverse of the sprinkler tube. The rod could be recessed instead of slotted, if desired.

The method of adjustment thus provided and the means for practicing that method, afford continuous adjustment even when the sprinkler is in operation. Thus, the extent of adjustment may be immediately observed by the operator. Further, indexing detent means are supplied so the operator may quickly and conveniently select any one of a plurality of predetermined positions of adjustment, thereby to secure instantaneously any desired distribution pattern available with an oscillatory-type lawn sprinkler.

It is, therefore, an object of the present invention to provide an improved driving linkage for an oscillating sprinkler.

Another object of the present invention is to provide improved adjustment means for an oscillatory sprinkler.

Yet another object of the present invention is to provide means for adjusting the oscillatory traverse of an oscillatory lawn sprinkler wherein the adjustment may be effected even when the sprinkler is in operation.

A still further object of the present invention is to provide an improved indexed adjusting mechanism for an oscillatory sprinkler.

Many other features, advantages and additional objects of the present invention will become manifest to those versed in the art upon making reference to the detailed description which follows and the accompanying sheets of drawings in which a preferred structural embodiment of an oscillating lawn sprinkler incorporating the improved driving linkage and adjustment means of the present invention is shown by way of illustrative example.

On the drawings:

FIGURE 1 is a side elevational view of a lawn sprinkler provided in accordance with the principles of the present invention;

FIGURE 2 is a view taken substantially on line II—II of FIGURE 1 and has parts broken away and parts shown in cross-section to illustrate additional details of construction;

FIGURE 3 is a fragmentary cross-sectional view taken generally on the line III—III of FIGURE 2 and shows additional details of construction of the adjustment means of the present invention;

FIGURE 4 is a bottom plan view of the adjustment means of FIGURE 3;

FIGURE 5 is an enlarged fragmentary plan elevational view with the cover of the housing removed and with parts shown in cross-section to illustrate additional details of construction; and FIGURE 6 is a side elevational view with parts broken away and with parts shown in cross-section illustrating additional details of construction.

As shown on the drawings:

The sprinkler of the present invention is shown generally at 10 and comprises a support 11 having an upright 12 at one end providing a bearing 13 for journaling one end of a sprinkler tube 14.

At the opposite end of the sprinkler, there is provided a housing indicated generally at 16 and carried on the support 11 by a housing bracket 15. The housing 16 has a bottom wall 17, side walls 18 and 19, a rear end wall 20, and a front wall 21. The side and end walls 18–21 have inwardly extending apertured bosses 22 facilitating the attachment thereto of a cover 23 which closes the housing 16 and, in effect, forms a top or upper wall for the housing 16.

Enclosed within the housing 16 is a prime mover 24 which may conveniently comprise a water-driven motor of the type utilized in lawn sprinkling mechanisms and herein shown as including a motor casing 26 having an inlet 27 and means forming an outlet 28.

The inlet 27 has a hose coupling 29 to facilitate attachment of the sprinkler 10 to a hose connected to a sill cock of an usual domestic water source. It will be understood that the impeller means within the motor casing 26 may be of any conventional construction and the water supplied from a source at increased pressure and directed through the inlet 27 is used to actuate the rotatable components of the motor 24, whereupon the water is discharged through the outlet 28 and into the sprinkler tube 14. In this connection, the outlet 28 has suitable bearing means for journaling the end of the sprinkler tube 14, as shown at 30. The sprinkler tube 14 extends through an opening 31 formed in the front end wall 21 of the housing 16.

A power take-off shaft 32 extends upwardly from the motor casing 26 and outwardly of a boss 33. The driving linkage of the present invention is located within the housing 16 and operates to drivingly interconnect the power take-off shaft 32 with the sprinkler tube 14.

It is customary in the mechanical arts to call a rotating link a crank; an oscillating link a lever, or beam, and the connecting link a connecting rod. Thus, the driving linkage of the present invention includes comparable members of a linkage. The rotating link is comprised by a crank 34 having a hub portion 36 connected for corotation with the power take-off shaft 32 and including a pivot pin 37 at the free end of the crank arm.

The oscillating link of the linkage is provided by a lever or beam shown at 38. More specifically, the link provided by the lever or beam 38 comprises a bevel gear segment including an arcuate peripheral portion 39 having formed thereon a plurality of circumferentially spaced teeth 40. The lever or beam 38 is further provided with an apertured apical portion through which passes a pivot pin 41 forming a fixed pivot for the lever or beam 38 and pivotally connecting the lever or beam 38 to the motor huosing 26.

It may be further noted that the lever or beam 38 is positioned so the gear teeth 40 overhang the front of the motor housing 26, thereby facilitating a good gear mesh with a bevel gear segment 42 carried on a sleeve 43 connected in firm assembly with the sprinkler tube 14 and corotatable therewith.

The connecting link of the linkage which includes the rotatable link 34 and the oscillatory link identified as the lever or beam 38 is provided by a connecting rod 44. A pivotal connection is effected between the connecting rod 44 and the lever or beam 38. In this connection, the lever or beam 38 has a boss 46. Both the rod 44 and the boss 46 are suitably apertured to cooperate with a pivot pin 47 which effects the desired pivotal connection.

At the opposite end of the connecting rod 44 there is provided a link arm 48 pivotally connected to the crank 34 by the pin 37 and pivotally connected to the connecting rod 44 by a pivot pin 49. Thus, the connecting rod 44 serves to convert and transmit the rotational movements of the crank 34 to the oscillatory link provided by the lever or beam 38 and the oscillations of the lever or beam 38 are imparted to the sprinkler tube 14 by the driving connection effected through the bevel gears 42.

In accordance with the principles of the present invention, adjustable fulcrum means are provided between the connecting rod and the housing. The fulcrum adjusting means of the present invention are shown generally at 50. First of all, there is provided a cross beam 55 which is a generally channel-shaped member having its opposite ends anchored to the side walls 18 and 19 by fasteners 18a and 19a. The cover 23 closely overlies the cross beam 55. The cover 23 has an aperture 52 and immediately subjacent thereto is provided a cup-shaped member 53 formed as an integral part of the cross beam 55 having a circumferentially continuous side wall 54 and an end wall 56 apertured as at 57 for passage of a shaft 51 adapted to be rotated on a fixed axis.

The shaft 51 has an enlarged disk-shaped portion 58 formed at the end thereof and received within the side wall 54 of the cup-shaped member 53. Additionally, the shaft 51 has an upwardly extending pilot portion 60 (FIGURE 3) which is received within a correspondingly shaped recess 61 of a rotatable knob 62. The knob 62 is particularly characterized by a reduced boss or pilot portion 59 received in the aperture 52, the end face of the boss 59 engaging against the end wall 56 of the cup-shaped member 53.

A fastener such as a screw 63 secures the knob 62 in firm assembly with the shaft 51 and locks the same for corotation. In this connection, the pilot portion 60 may be provided with a flat as at 64, it being understood that the recess 61 is provided with a corresponding flat to insure rotatable cooperation between the shaft 51 and the knob 62.

Note that the knob 62 is positioned in a manually accessible position outside of the housing 16 and on the top wall provided by the cover 23.

The enlarged disk portion 58 is particularly characterized by the formation therein of a threaded aperture 66 in which is received a fulcrum pin 67. The fulcrum pin has a threaded stem 68 for effecting firm assembly with the shaft 51 and further includes a bearing portion 69 which is of smaller diameter than a head portion 70 on the end of the pin 67.

The connecting rod 44 is formed with an elongated slot 71 sized to receive the bearing portion 69 of the fulcrum pin 67. Thus, the enlarged head 70 underlies the edges of the slot 71, while the bottom surface of the shaft 51 at the enlarged disk-shaped boss 58 overlies the upper edges of the slot 71 in the connecting rod 44.

The threaded aperture 66 is located in the shaft 51 in offset relation to the rotational axis thereof so that rotation of the knob 62 and hence of the shaft 51 will adjustably position the fulcrum pin 67 along a path determined by the loci prescribed by the different angular adjustment positions of the shaft 51. The circular path prescribed by the fulcrum pin 67 is immediately adjacent the connecting rod 44. Accordingly, the fulcrum formed between the connecting rod 44 and the fulcrum pin 67 may be adjusted through a wide range.

In order to provide an indexed selection of adjustment, the circumferential wall 54 of the cup-shaped member 53 has formed in the inside surface thereof a plurality of circumferentially spaced recesses as shown at 74 (FIGURE 4). Spring-biased detent means carried by the shaft at the enlarged hub portion 58 cooperate with the recesses 74 to lock the shaft 51 in angularly adjusted positions. More specifically, the enlarged portion 58 is recessed as at 76 and a coil spring 77 is bottomed at the recess 76 to press a detent ball 78 outwardly of the recess and into engagement with a corresponding recess 74.

By virtue of the provision thus made, instantaneous adjustment can be effected merely by manually rotating the knob 62 which is rotatable on a fixed axis insofar as the housing 16 is concerned. Thus, the adjustment can be effected even when the sprinkler is in operation.

Although minor modifications might be suggested by those versed in the art, it should be understood that we wish to embody within the scope of the patent warranted hereon all such modifications as reasonably and properly come within the scope of our contribution to the art.

We claim as our invention:

1. A driving linkage for an oscillating sprinkler comprising a crank rotatably driven, a lever having one end pivotally supported and having its opposite end adapted to be drivingly connected to a tube, a connecting rod interconnecting said crank and said lever, and means for adjusting the oscillatory traverse of said lever comprising an eccentric mounted pivot pin adjustably positioned adjacent an intermediate portion of said connecting rod, said connecting rod being recessed to receive said pin, whereby the fulcrum between said rod and said pin may be adjusted to vary said traverse.

2. In an oscillating lawn sprinkler of the type comprising a support means having spaced bearings and a tube journaled in said bearings for oscillation with a housing enclosing one of said bearings and a water-driven motor having an inlet to be connected to a water supply and an outlet connected to said tube, the improvement of said motor having a rotatable power take-off shaft extending into the interior of said housing, a crank connected to said shaft and rotatably driven thereby, a lever pivoted on one end to said housing and having a driver bevel gear segment formed on its opposite end, a coupling member on said tube having a driven bevel gear segment meshing with said driver gear segment, and connecting rod means interconnecting said lever and said crank including a rod having a recessed fulcrum area, a fulcrum pin extending into said recessed fulcrum area, and means to adjustably position said fulcrum pin to vary the oscillatory traverse of said tube.

3. In an oscillating lawn sprinkler of the type comprising a support means having spaced bearings and tube journaled in said bearings for oscillation with a housing enclosing one of said bearings and a water-driven motor having an inlet to be connected to a water supply and an outlet connected to said tube, the improvement of said motor having a rotatable power take-off shaft extending into the interior of said housing, a crank connected to said shaft and rotatably driven thereby, a lever pivoted on one end to said housing and having a driver bevel gear segment formed on its opposite end, a coupling member on said tube having a driven bevel gear segment meshing with said driver gear segment, and connecting rod means interconnecting said lever and said crank including a rod having a recessed fulcrum area, a fulcrum pin extending into said recessed fulcrum area, and means to adjustably position said fulcrum pin to vary the oscillatory traverse of said tube, comprising a shaft rotatably carried by said housing, a manually operable knob connected to said shaft outside of said housing, and means connecting said shaft to said fulcrum pin but in offset relation relative to the axis of said shaft, whereby the location of said fulcrum pin may be varied to adjust the oscillatory traverse of said tube.

4. In an oscillating lawn sprinkler, a water motor having a crank driven at substantially constant speed, a lever having a fixed pivot at one end and a driving connection at the other end, a tube having a driven connection with said driving connection of said lever, a connecting rod pivotally connected to said lever at one end and to said crank at the other end, and means forming an adjustable pin center having an adjustable connection to said connecting rod and being movable through a loci to vary the lever fulcrum, thereby adjusting the oscillatory traverse of the tube.

5. In a driving linkage for an oscillating lawn sprinkler, a rotating link comprising a motor driven crank arm, an oscillating link comprising a lever having a fixed pivot at one end and a tube driving connection at its opposite end, a connecting link comprising a connecting rod having pivotal connections at opposite ends with said crank and with said lever, respectively, and means forming an adjustable fulcrum for said connecting rod, thereby to vary the oscillatory traverse of said lever as a function of the fulcrum adjustment, comprising a knob actuated rotatable shaft having an eccentrically offset pin positionable through a loci adjacent said connecting rod, said connecting rod being slotted to receive said pin and to pivot about said pin at adjusted fulcrum positions.

6. In a driving linkage for an oscillating lawn sprinkler, a rotating link comprising a motor driven crank arm, an oscillating link comprising a lever having a fixed pivot at one end and a tube driving connection at its opposite end, a connecting link comprising a connecting rod having pivotal connections at opposite ends with said crank and with said lever, respectively, and means forming an adjustable fulcrum for said connecting rod, thereby to vary the oscillatory traverse of said lever as a function of the fulcrum adjustment, comprising a manually rotatable knob having a fixed axis of rotation and adjustable interconnecting means between said connecting rod and said knob forming an adjustable fulcrum for said connecting rod.

7. In a driving linkage for an oscillating lawn sprinkler, a rotating link comprising a motor driven crank arm, an oscillating link comprising a lever having a fixed pivot at one end and a tube driving connection at its opposite end, a connecting link comprising a connecting rod having pivotal connections at opposite ends with said crank and with said lever, respectively, and means forming an adjustable fulcrum for said connecting rod, thereby to vary the oscillatory traverse of said lever as a function of the fulcrum adjustment, comprising a manually rotatable knob having a fixed axis of rotation, a pin connected to said knob but eccentrically offset from said fixed axis, said rod being slotted to receive said pin as a fulcrum, whereupon rotation of said knob will variably adjust the fulcrum to control the oscillatory traverse of the lever.

8. In an oscillatory sprinkler, a housing, a water-driven motor including a motor casing in said housing and having an inlet and an outlet, a tube connected to said outlet and extending into said housing, said tube being journaled for oscillation in said motor casing, a driving linkage in said housing and including a rotatable link comprising a crank driven by said motor and projecting outwardly of said motor casing, an oscillatory link comprising a lever having a fixed pivotal connection with said motor casing at one end and having a driving connection with said tube at its opposite end, and a connecting link comprising a connecting rod having pivotal connections at opposite ends with said crank and with said lever, respectively, and adjustment means for varying the oscillatory traverse of the tube comprising a shaft journaled on a fixed axis in said housing, a manually rotatable knob connected to said shaft on the outside of said housing, said shaft having a disk-shaped portion inside of said housing for corotation therewith, and a fulcrum pin carried by said disk in offset relation to said axis, said connecting rod having a slot formed therein receiving said fulcrum pin, said fulcrum pin being adjustably positioned upon rotation of said shaft to vary the oscillatory traverse of said tube.

9. In an oscillatory sprinkler as defined in claim 8, detent means between said housing and said disk, thereby to index said adjustment means.

10. In an oscillatory sprinkler as defined in claim 9, said detent means comprising a cup-shaped member fastened to said housing and having a circumferentially extending wall adjacent said disk, a plurality of circumferentially spaced recesses in said wall and a spring-biased detent ball carried by said disk engageable with said recesses.

11. In a driving linkage for an oscillating lawn sprinkler,
   a rotating link comprising
      a motor driven crank arm,
   an oscillating lever having
      a fixed pivot at one end and
      a tube driving connection at its opposite end,
   a connecting link comprising
      a connecting rod having pivotal connections at opposite ends with said crank and with said lever, respectively,
   means forming a fulcrum pin,
      said connecting rod having means for bearing engagement with said fulcrum pin,
   support means carrying said fulcrum pin on a fixed axis, said fulcrum pin being eccentrically offset relative to said fixed axis and
   adjustable means for selectively positioning said fulcrum pin on said support means through a loci adjacent said connecting rod,
thereby to vary the oscillatory traverse of said lever as a function of the fulcrum adjustment.

12. In an oscillatory sprinkler,
   a housing,
   a rotatable adjustment knob having a shaft,
   said housing having bearing means supporting said shaft for rotation on a fixed axis,
   detent means between said housing and said knob for indexing the angular positions of said knob corresponding to the angular positions of said shaft, and
   a fulcrum pin connected to said shaft and being eccentrically offset relative to said fixed axis and positionable through a loci relative to said fixed axis upon actuation by said knob for variably and selectively fulcruming the driving linkage of the sprinkler.

13. In an oscillatory sprinkler,
   a housing,
   a rotatable adjustment knob having a shaft,
   said housing having bearing means supporting said shaft for rotation on a fixed axis,
   detent means between said housing and said knob for indexing the angular positions of said knob corresponding to the angular positions of said shaft, a fulcrum pin connected to said shaft in eccentrically offset relation to said fixed axis and positionable through a loci relative to said fixed axis upon actuation by said knob for variably and selectively fulcruming the driving linkage of the sprinkler,
a driving linkage for oscillation including
    a rotating link,
        an oscillating link and
        a connecting rod,
said fulcrum pin and said connecting rod having an adjustable bearing connection,
whereby actuation of said knob will adjust said fulcrum pin through said loci to vary the oscillatory traverse of said oscillating link.

References Cited in the file of this patent

UNITED STATES PATENTS

| | | |
|---|---|---|
| 1,696,385 | Coles | Dec. 25, 1928 |
| 2,676,842 | Squiers | Apr. 27, 1954 |
| 2,886,250 | Smith et al. | May 12, 1959 |
| 2,914,255 | Jepson | Nov. 24, 1959 |
| 2,921,474 | Ballard | Jan. 19, 1960 |
| 2,932,457 | Ballard | Apr. 12, 1960 |
| 2,945,385 | Nelson | July 19, 1960 |

FOREIGN PATENTS

| | | |
|---|---|---|
| 252,070 | Italy | Feb. 19, 1927 |